Patented May 31, 1932

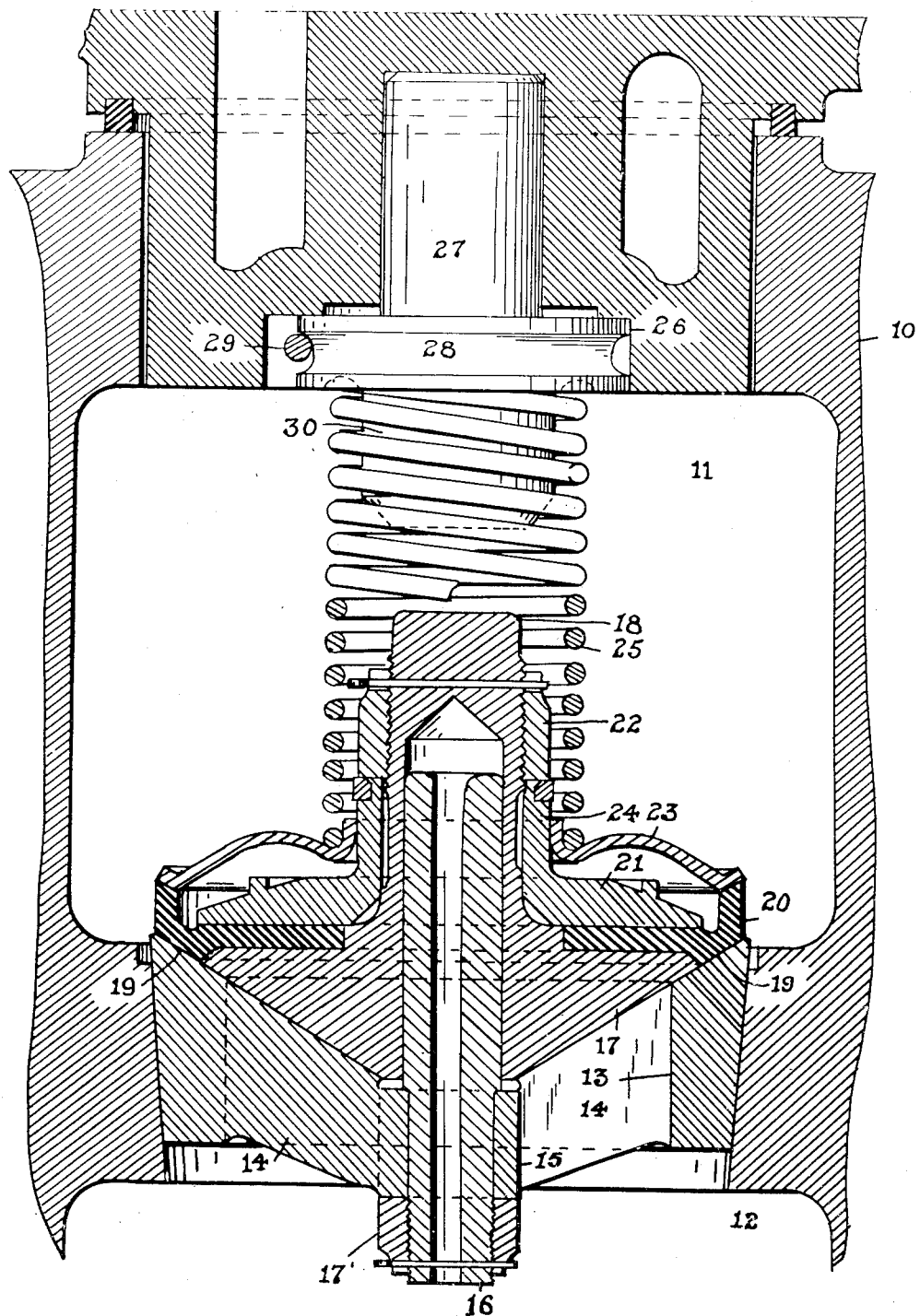

1,861,420

UNITED STATES PATENT OFFICE

JOSEPH R. MAHAN, OF TOLEDO, OHIO, ASSIGNOR TO THE NATIONAL SUPPLY COMPANY, OF TOLEDO, OHIO, A CORPORATION OF OHIO

VALVE

Application filed December 17, 1930. Serial No. 502,885.

My invention relates to valves designed particularly for slush pumps, but capable of use with other devices.

The object of this invention is to provide a valve having besides a metal closure a ring of elastic material serving as a seal between the valve seat and the metal closure. Other objects appear hereinafter.

Referring to the accompanying drawing, it shows a central longitudinal section through a structure embodying my invention, parts being broken away.

Referring to the drawing, 10 designates the valve casing having the discharge chamber 11 and 12 is the intake or suction chamber. Between the two chambers is the inserted valve seat 13 in the form of a ring provided with the ribs 14 which extend toward each other and terminate in the hub 15. This hub contains the upstanding pin or guide 16 which is secured to the hub by the nut 17′ and extends up into the chamber 11. The valve member 17 is slidable upon the guide 16 and has its lower surface beveled inwardly and downwardly so as to be seated closely upon the similarly beveled upper edge of the valve seat 13. The valve member 17 is continuous from its periphery to the guide 16 at its central portion. This central portion is continued so as to form a cap 18 above the free end of the guide 16. The valve member together with its extension over the end of the guide 16 is integral so that no fluid can pass from one side of the valve member 17 to the other except between the valve member and the seat 13.

The valve member 17 does not overlap the entire upper surface of the valve seat, but leaves an annular portion 19 as a seat for the flexible sealing ring 20 which surrounds the stem or upper extension of the valve member and is clamped to the upper surface of the valve member by the annular clamping member 21. This clamping member surrounds the said valve extension on which a nut 22 is threaded and engages the outer end of the clamp in order to clamp the flexible sealing ring tightly between the valve member 17 and the clamping member 21.

The clamping member 21 does not extend entirely to the periphery of the sealing ring, but leaves the upper face near its periphery to be engaged by the under-face of the follower plate 23 which surrounds the neck 24 of the clamping member 21. A coil spring 25 having one end bearing upon the rotary plug 26 and the other end upon the follower plate 23 is provided to urge the follower plate 23 into contact with the outer portion of the sealing ring 20 in order to establish initial contact of the ring with the seal 19. The spring also urges the valve member 17 as well as the sealing ring toward their seat. This rotary plug has a stem 27 rotatable in the upper wall of the casing 10 and also has the peripheral groove 28 to receive the pin 29 carried by the casing. This pin allows the plug and the spring to rotate and prevents its accidental escape from the position shown. The plug has on its face opposite the stem 27 the guide 30 which receives the outer end of the spring.

The opening movement of the valve member 17 is limited to the distance between the cap 18 and the guide 30. The clamping member 21 by means of the nut 22 positively holds the flexible sealing ring in its normal position, there being no plurality of cap screws and guides which are common in some other valves. Another important feature is that of having in one integral structure the valve provided with a hollow extension covering the guide 16 so that no fluid can pass into the chamber 11 along the guide 16. It is to be noted that the guide 16 is hollow so that no fluid can be trapped between its upper end and the cap 18.

I claim:—

1. In a valve structure, a casing and a valve seat comprising an outer ring seated in an opening in the casing, a central rub, and ribs connecting the ring and the hub, in combination with a valve member adapted to close the seat but not to cover the outer portion thereof, a flexible sealing ring carried by the valve member and having its outer portion adapted to be seated on the said outer portion of the seat, a single hollow central valve stem carried by the valve member, a clamping member to clamp the sealing ring to the valve member, a nut threaded on the valve stem and clamping the clamping member against the sealing ring, an upstanding guide supported by the hub and loosely fitting the hollow in the valve stem, a follower resting on the outer part of the sealing ring and guided by the clamping member, and a spring surrounding the valve stem to press the follower toward the sealing ring.

2. In a valve structure, a casing and a valve seat comprising an outer ring seated in an opening in the casing, a central hub, and ribs connecting the ring and the hub, in combination with a valve member adapted to close the seat but not to cover the outer portion thereof, a flexible sealing ring carried by the valve member and having its outer portion adapted to be seated on the said outer portion of the seat, a single hollow central valve stem carried by the valve member, the end of the stem at the outlet side of the valve seat being closed, a clamping member to clamp the sealing ring to the valve member, a nut threaded on the valve stem and clamping the clamping member against the sealing ring, an upstanding guide supported by the hub and loosely fitting the hollow in the valve stem, a follower resting on the outer part of the sealing ring and guided by the clamping member, and a spring surrounding the valve stem to press the follower toward the sealing ring, the said guide being hollow from end to end and one end of the guide opening at the inlet side of the valve seat.

In testimony whereof, I hereunto affix my signature.

JOSEPH R. MAHAN.